United States Patent
Kawashima et al.

(10) Patent No.: US 10,246,368 B2
(45) Date of Patent: Apr. 2, 2019

(54) OPTICAL GLASS, OPTICAL ELEMENT AND OPTICAL DEVICE USING OPTICAL GLASS

(71) Applicant: NIKON CORPORATION, Tokyo (JP)

(72) Inventors: Tatsunori Kawashima, Sagamihara (JP); Hiroshi Yamamoto, Yamato (JP); Kohei Yoshimoto, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/954,069

(22) Filed: Apr. 16, 2018

(65) Prior Publication Data

US 2018/0237333 A1 Aug. 23, 2018

Related U.S. Application Data

(63) Continuation of application No. PCT/JP2016/073461, filed on Aug. 9, 2016.

(30) Foreign Application Priority Data

Nov. 30, 2015 (JP) ................................ 2015-233763

(51) Int. Cl.

| | |
|---|---|
| *C03C 3/068* | (2006.01) |
| *G02B 1/00* | (2006.01) |
| *G02B 21/06* | (2006.01) |
| *G02B 21/16* | (2006.01) |
| *G03B 17/14* | (2006.01) |
| *G03B 42/00* | (2006.01) |

(52) U.S. Cl.
CPC ................ *C03C 3/068* (2013.01); *G02B 1/00* (2013.01); *G02B 21/06* (2013.01); *G02B 21/16* (2013.01); *G03B 17/14* (2013.01); *G03B 42/00* (2013.01)

(58) Field of Classification Search
CPC ......... C03C 3/062; C03C 3/064; C03C 3/066; C03C 3/068
See application file for complete search history.

(56) References Cited

U.S. PATENT DOCUMENTS

2007/0179038 A1* 8/2007 Uehara .................. C03C 3/068
501/53
2008/0176733 A1* 7/2008 Oogaki .................. C03C 3/068
501/78

FOREIGN PATENT DOCUMENTS

| JP | 60-42245 | 3/1985 |
|---|---|---|
| JP | 62-100449 | 5/1987 |
| JP | 5-262533 | 10/1993 |
| JP | 2006-306648 | 11/2006 |
| JP | 2009-263141 | 11/2009 |
| JP | 2013-82623 | 5/2013 |
| JP | 2013209232 A * | 10/2013 |

OTHER PUBLICATIONS

International Search Report dated Sep. 13, 2016 in corresponding International Patent Application No. PCT/JP2016/073461.

* cited by examiner

*Primary Examiner* — Elizabeth A. Bolden

(57) ABSTRACT

To provide an optical glass which has a unique combination of anomalous dispersibility in a visible range with that in a near-infrared range. Provided is an optical glass containing respective components of $SiO_2$ from 14 to 26% by mass, $B_2O_3$ from 9 to 16% by mass, and $La_2O_3$ from 10 to 42% by mass as essential components, and containing respective components of ZnO, $Y_2O_3$, $ZrO_2$, $Ta_2O_5$, $Li_2O$, and $Na_2O$ as optional components, and satisfying respective relationships of $SiO_2+B_2O_3$ from 28 to 36% by mass, $ZrO_2+Ta_2O_5$ from 6 to 16% by mass, $La_2O_3+Y_2O_3+ZnO$ from 43 to 59% by mass, and $Li_2O+Na_2O$ from 2 to 14% by mass.

9 Claims, 3 Drawing Sheets

OPTICAL GLASS, OPTICAL ELEMENT AND OPTICAL DEVICE USING OPTICAL GLASS

CROSS-REFERENCE TO RELATED APPLICATIONS

This application is a continuation application, under 35 U.S.C. § 111(a), of International Application No. PCT/JP2016/73461, filed Aug. 9, 2016, and based upon and claiming the benefit of foreign priority from Japanese Patent Application No. 2015-233763 filed on Nov. 30, 2015, the entire contents of which are incorporated herein by reference.

TECHNICAL FIELD

The present invention relates to an optical glass, and an optical element and an optical device that use the optical glass.

BACKGROUND ART

For example, Patent Literature 1 discloses an optical glass that has a refractive index of 1.70 to 1.82 and an Abbe number of 40 to 55. It is possible to use such an optical glass as a lens of an optical device such as a camera or a microscope.

Now, in optical systems in optical devices such as a camera or a microscope, in order to correct the chromatic aberrations of lens in the visible range, ordinary optical glass is used in combination with optical glass that differs in partial dispersion ratio from the ordinary optical glass (has anomalous dispersibility). On the other hand, in recent years, microscopic observations with the use of light in the near-infrared range, including multiphoton microscope (multiphoton microscope), and the like have been also being made, and there is an increasing need for optical glass capable of correcting chromatic aberrations at wavelengths not only in the visible range but also in the near-infrared range.

CITATION LIST

Patent Literature

Patent Literature 1: JP 2006-306648 A

SUMMARY OF INVENTION

Technical Problem

The present invention has been made in view of the circumstances mentioned above, and an object of the invention is to provide an optical glass which has a unique combination of anomalous dispersibility in a visible range with that in a near-infrared range.

Solution to Problem

A first aspect of the present invention for solving the problems mentioned above is
an optical glass containing respective components of
$SiO_2$ from 14 to 26% by mass,
$B_2O_3$ from 9 to 16% by mass, and
$La_2O_3$ from 10 to 42% by mass as essential components, and
containing respective components of $ZnO$, $Y_2O_3$, $ZrO_2$, $Ta_2O_5$, $Li_2O$, and $Na_2O$ as optional components, and satisfying respective relationships of
$SiO_2+B_2O_3$ from 28 to 36% by mass,
$ZrO_2+Ta_2O_5$ from 6 to 16% by mass,
$La_2O_3+Y_2O_3+ZnO$ from 43 to 59% by mass, and
$Li_2O+Na_2O$ from 2 to 14% by mass.

A second aspect of the present invention is an optical element including the optical glass according to the first aspect.

A third aspect of the present invention is an optical device including the optical element according to the second aspect.

DESCRIPTION OF EMBODIMENTS

Figure 1:
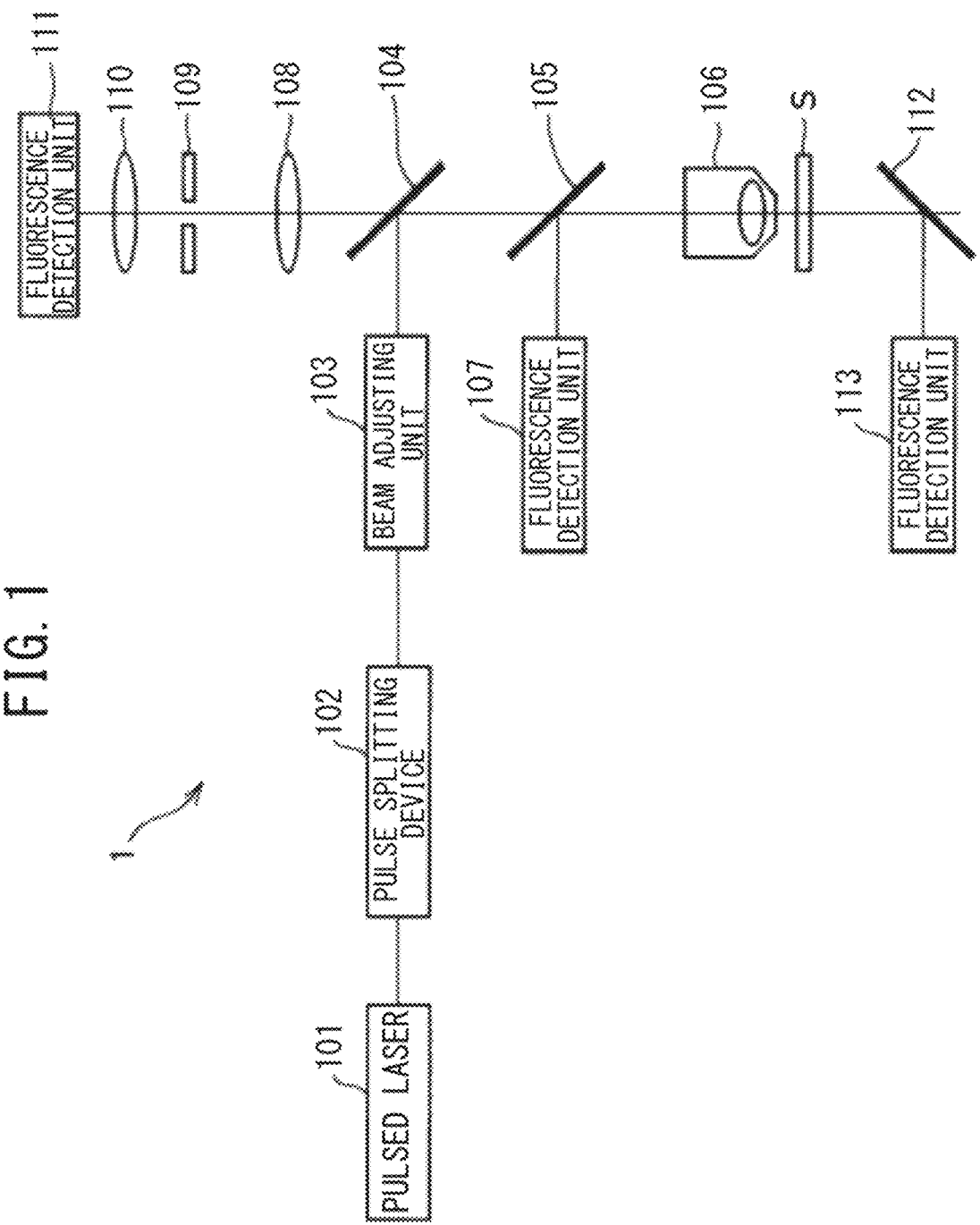
FIG. 1 is a block diagram showing an example of the configuration of a multiphoton microscope including an optical element that uses an optical glass according to one embodiment of the present invention.

Embodiments of the present invention (hereinafter, referred to as "the present embodiment") will be described below. The following embodiments are considered by way of example for explaining the present invention, and not intended to limit the present invention to the following description. The present invention can be modified and carried out appropriately within the scope of the invention.

In addition, in the present specification, unless otherwise specified, the contents of respective components are all considered on a % by mass basis with respect to the total glass mass of the composition in terms of oxide. The composition in terms of oxide herein refers to assuming that all the oxides, complex salts, and the like used as raw materials for glass constituents according to the present embodiment are all decomposed into oxides upon melting, a composition where each component contained in the glass is represented with the total oxide mass regarded as 100% by mass.

The optical glass according to the present embodiment is an optical glass of $SiO_2$—$B_2O_3$—$La_2O_3$ type. Specifically, the optical glass is adapted to contain respective components of $SiO_2$: 14 to 26%, $B_2O_3$: 9 to 16%, $La_2O_3$: 10 to 42% as essential components, and contains respective components of $ZnO$, $Y_2O_3$, $ZrO_2$, $Ta_2O_5$, $Li_2O$, and $Na_2O$ as an optional component. Further, the optical glass is adapted to contain the respective relationships of $SiO_2+B_2O_3$: 28 to 36%, $ZrO_2+Ta_2O_5$: 6 to 16%, $La_2O_3+Y_2O_3+ZnO$: 43 to 59%, and $Li_2O+Na_2O$: 2 to 14%. As long as these relationships are satisfied, the content of any of the optional components may be 0% by mass. The optical glass according to the present embodiment can be adapted to be an optical glass which has a unique combination of anomalous dispersibility in the visible range with that in the near-infrared range, thereby making it possible to broaden the degree of freedom for optical design than ever before.

Regarding ordinary optical glass, it is known that a substantially linear relationship is established when the Abbe number and the partial dispersion ratio are respectively indicated on the horizontal axis and the vertical axis (normal partial dispersion), and the anomalous dispersibility is expressed by the degree of deviation from the foregoing straight line. The value ($\Delta P_{g,F}$) indicating the anomalous dispersibility in the visible range can be obtained from the Abbe number ($v_d$) and the partial dispersion ratio ($P_{g,F}$) in the visible range, based on the method mentioned in Examples as described later. Similarly, the value ($\Delta P_{c,t}$) indicating the anomalous dispersibility in the near-infrared range can be obtained from the Abbe number ($v_d$) and the partial dispersion ratio ($P_{c,t}$) in the near-infrared range, based on the method mentioned in Examples as described later. In general, as one of the value ($\Delta P_{g,F}$) indicating the anomalous dispersibility in the visible range and the value ($\Delta P_{c,t}$) indicating the anomalous dispersibility in the near-infrared range is larger, the other is smaller. However, in the optical glass according to the present embodiment, the value ($\Delta P_{g,F}$) indicating the anomalous dispersibility in the visible range and the value ($\Delta P_{c,t}$) indicating the anomalous dispersibility in the near-infrared range can be both small values. Such optical glass can be suitably used as a lens for correcting the chromatic aberration between the visible range and the near-infrared range in the optical system of the optical device. It is to be noted that in this specification, the fact that the value ($\Delta P_{g,F}$) indicating the anomalous dispersibility in the visible range and the value ($\Delta P_{c,t}$) indicating the anomalous dispersibility in the near-infrared range are both small values is described as a unique combination of anomalous dispersibility in the visible range with that in a near-infrared range.

Details of compositions and properties will be described for each component of the optical glass according to the present embodiment.

$SiO_2$ is an essential component as a glass-forming oxide, which is effective for lowering the refractive index. However, the addition thereof in large amounts will increase $\Delta P_{g,F}$. From the foregoing viewpoint, the content of $SiO_2$ is 14 to 26%, preferably 14 to 24%, more preferably 14 to 22%.

$B_2O_3$ is an essential component as a glass-forming oxide, which improves the devitrification resistance. In addition, $B_2O_3$ is effective for lowering the refractive index, $\Delta P_{g,F}$. From the foregoing viewpoint, the content of $B_2O_3$ is 9 to 16%, preferably 10 to 16%, more preferably 11 to 16%.

$La_2O_3$ is an essential component for achieving desired refractive index and Abbe number. However, the addition thereof in large amounts will decreases the devitrification resistance, thereby increasing $\Delta P_{g,F}$ and increasing $n_d$. From the foregoing viewpoint, the content of $La_2O_3$ is 10 to 42%, preferably 13 to 39%, more preferably 16 to 36%.

ZnO is an optional component which is effective for achieving desired refractive index and Abbe number. However, the addition thereof in large amounts will decreases the devitrification resistance, thereby increasing $\Delta P_{g,F}$ and slightly increasing $n_d$. From the foregoing viewpoint, the content of ZnO is preferably 0 to 45%, more preferably 3 to 40%, further preferably 6 to 35%.

$Y_2O_3$ is an optional component which is effective for achieving desired refractive index and Abbe number. However, the addition thereof in large amounts will decreases the devitrification resistance, thereby increasing $\Delta P_{g,F}$ and increasing $n_d$. From the foregoing viewpoint, the content of $Y_2O_3$ is preferably 0 to 20%, more preferably 0 to 10%, further preferably 0 to 5%.

$ZrO_2$ is an optional component which is effective for lowering $\Delta P_{g,F}$. However, the addition thereof in large amounts will significantly decrease the devitrification resistance, and also greatly increase $n_d$. From the foregoing viewpoint, the content of $ZrO_2$ is preferably 0 to 7%, more preferably 1 to 7%, further preferably 2 to 7%.

$Ta_2O_5$ is an optional component which is effective for lowering $\Delta P_{g,F}$, and also enhancing the devitrification resistance. However, the addition thereof in large amounts will greatly increase $n_d$. From the foregoing viewpoint, the content of $Ta_2O_5$ is preferably 0 to 15%, more preferably 0 to 13%, further preferably 0 to 11%.

$Li_2O$ is an optional component which is effective for lowering $\Delta P_{g,F}$ and $n_d$. However, the addition thereof in large amounts will significantly decrease the devitrification resistance. From the foregoing viewpoint, the content of $Li_2O$ is preferably 0 to 8%, more preferably 0 to 6%.

$Na_2O$ is an optional component which is effective for lowering $\Delta P_{g,F}$ and $n_d$. However, the addition thereof in large amounts will significantly decrease the devitrification resistance. From the foregoing viewpoint, the content of $Na_2O$ is preferably 0 to 13%, more preferably 0 to 10%.

$Sb_2O_3$ is an optional component which is effective for clarifying and homogenizing the glass. Therefore, $Sb_2O_3$ may be added as a defoaming agent. From the foregoing viewpoint, the content of $Sb_2O_3$ is preferably 0 to 1%.

As a combination of the optional components mentioned above, it is preferable to further contain respective components of ZnO: 0 to 45%, $Y_2O_3$: 0 to 20%, $ZrO_2$: 0 to 7%, $Ta_2O_5$: 0 to 15%, $Li_2O$: 0 to 8%, $Na_2O$: 0 to 13%, and $Sb_2O_3$: 0 to 1%.

In order to improve the devitrification resistance of the optical glass, it is desirable to introduce sufficient amounts of $B_2O_3$ and $SiO_2$, but when the amounts exceed a certain amount, $\Delta P_{g,F}$ will increase, thereby failing to achieve desired anomalous dispersibility. From the foregoing viewpoint, the sum of the $SiO_2$ and $B_2O_3$ contents (abbreviated as $SiO_2+B_2O_3$, the same applies hereinafter) is 28 to 36%, preferably 28 to 35%, more preferably 28 to 34%.

In order to achieve a desired constant value/anomalous dispersibility, it is desirable to introduce $ZrO_2$ and $Ta_2O_5$ in sufficient amounts. From the foregoing viewpoint, $ZrO_2+Ta_2O_5$ is 6 to 16%, preferably 7 to 16%, more preferably 8 to 16%.

It is desirable to introduce $La_2O_3$, $Y_2O_3$, and ZnO in sufficient amounts in order to achieve a desired constant value/anomalous dispersibility, but the excessive introduction thereof will make the glass more likely to devitrify easily. From the foregoing viewpoint, $La_2O_3+Y_2O_3+ZnO$ is 43 to 59%, preferably 43 to 58%, more preferably 43 to 56%.

When the sum of $Li_2O$ and $Na_2O$ exceeds a certain amount, the glass stability will be impaired. From the foregoing viewpoint, $Li_2O+Na_2O$ is 2 to 14%, preferably 2 to 12%, more preferably 2 to 10%.

Without limiting to the components mentioned above, any other optional components may be further added within a scope that does not interfere with achieving the object of the optical glass according to the present embodiment.

Next, physical property values of the optical glass according to the present embodiment will be described.

The optical glass according to the present embodiment is preferably related to a medium refractive index/medium dispersion region. From the foregoing viewpoint, the refractive index ($n_d$) of the optical glass according to the present embodiment is preferably 1.68 to 1.75, more preferably 1.68 to 1.745, and further preferably 1.68 to 1.74. The Abbe number ($v_d$) of the optical glass according to the present embodiment is preferably 43 to 50, more preferably 43 to 49, and further preferably 43 to 48. It is particularly preferable for both the refractive index ($n_d$) and the Abbe number ($v_d$) to satisfy the ranges mentioned above.

From the viewpoint of the achromatic effect in the near-infrared range and the visible range, the value ($\Delta P_{c,t}$) indicating anomalous dispersibility in the near-infrared range and the value ($\Delta P_{g,F}$) indicating anomalous dispersibility in the visible range are each preferably small. From the foregoing viewpoint, the value ($\Delta P_{c,t}$) indicating anomalous dispersibility in the near-infrared range is preferably 0.0100 or less, more preferably 0.0070 or less, further preferably 0.0050 or less. The value ($\Delta P_{g,F}$) indicating anomalous dispersibility in the visible range is preferably −0.0075 or less, more preferably −0.0078 or less, further preferably −0.0081 or less. Furthermore, it is particularly preferable for both $\Delta P_{c,t}$ and $\Delta P_{g,F}$ to satisfy the ranges mentioned above.

From the viewpoint mentioned above, it is preferable for $\Delta P_{c,t}$ and $\Delta P_{g,F}$ to satisfy the following relational expression.

$$\Delta P_{c,t} \leq -5 \cdot (\Delta P_{g,F} + 0.0075)$$

Even when this relational expression is satisfied, $\Delta P_{c,t}$ is preferably 0.0100 or less, and $\Delta P_{g,F}$ is preferably −0.0075 or less.

As described above, the optical glass according to the present embodiment is an optical glass which has unique anomalous dispersibility in the near-infrared range and the visible range. For example, in an optical system that uses such optical glass in combination with other optical glass, it is possible to correct the chromatic aberration between the near-infrared range and the visible range, thereby making it possible to broaden the degree of freedom for optical design than ever before.

The optical glass according to the present embodiment is suitable as an optical element such as a lens of an optical device such as a camera or a microscope. As an optical device, above all, a multiphoton microscope is particularly suitable.

Multiphoton Microscope

FIG. 1 is a block diagram illustrating an example of the configuration of a multiphoton microscope 1 according to an embodiment of the present invention. The multiphoton microscope 1 includes, as optical elements, an objective lens 106, a condenser lens 108, and an imaging lens 110. Hereinafter, the optical system of the multiphoton microscope 1 will be mainly described.

The pulsed laser device 101 emits ultrashort pulsed light that has a pulse width of femtoseconds (for example, 100 femtoseconds), for example, with a near-infrared wavelength (about 1000 nm). The ultrashort pulsed light immediately after being emitted from the pulsed laser device 101 is generally linearly polarized light polarized in a predetermined direction.

The pulse splitting device 102 splits the ultrashort pulsed light, and emits the ultrashort pulsed light at the increased repetition frequency thereof.

The beam adjusting unit 103 has the function of adjusting the beam diameter of the ultrashort pulsed light incident from the pulse splitting device 102 in accordance with the pupil diameter of the objective lens 106, the function of adjusting the convergence and divergence angles of ultrashort pulsed light in order to correct the axial chromatic aberration (focus difference) between the wavelength of multiphoton excitation light emitted from a sample S and the wavelength of the ultrashort pulsed light, the pre-chirping function (group velocity dispersion compensation function) of providing reverse group velocity dispersion to the ultrashort pulsed light in order to correct the increase in the pulse width of the ultrashort pulsed light due to group velocity dispersion while passing through the optical system, and the like.

The repetition frequency of the ultrashort pulsed light emitted from the pulsed laser device 101 is increased by the pulse splitting device 102, and the light is adjusted as described above by the beam adjusting unit 103. Then, the ultrashort pulsed light emitted from the beam adjusting unit 103 is reflected toward the dichroic mirror 105 by the dichroic mirror 104 to pass through the dichroic mirror 105, and focused by the objective lens 106 to irradiate the sample S. In this regard, the observation surface of the sample S may be scanned with the ultrashort pulsed light by using a scanning means (not shown).

For example, in the case of fluorescence observation of the sample S, a fluorescent dye with which the sample S is dyed is multiphoton-excited in a region of the sample S irradiated with the ultrashort pulse light and in the vicinity thereof, thereby producing fluorescence with a shorter wavelength than the ultrashort pulsed light as an infrared wavelength (hereinafter referred to as "observation light").

The observation light emitted from the sample S in a direction toward the objective lens 106 is collimated by the objective lens 106, and depending on the wavelength, reflected by the dichroic mirror 105 or transmitted through the dichroic mirror 105.

The observation light reflected by the dichroic mirror 105 enters the fluorescence detection unit 107. The fluorescence detection unit 107 composed of, for example, a barrier filter, a PMT (photo multiplier tube), and the like, receives the observation light reflected by the dichroic mirror 105, and outputs an electric signal corresponding to the amount of light. In addition, in accordance with scanning the observation surface of the sample S with the ultrashort pulse light, the fluorescence detection unit 107 detects observation light over the observation surface of the sample S.

On the other hand, the observation light transmitted through the dichroic mirror 105 is subjected to descanning by a scanning means (not shown), transmitted through the dichroic mirror 104, condensed by the condenser lens 108, transmitted through a pinhole 109 provided at a position substantially conjugated with the focal position of the objective lens 106, and passed through the imaging lens 110 to enter the fluorescence detection unit 111. The fluorescence detection unit 111 composed of, for example, a barrier filter, PMT, and the like, receives the observation light imaged on the light-receiving surface of the fluorescence detection unit 111 by the imaging lens 110, and outputs an electric signal corresponding to the amount of light. In addition, in accordance with scanning the observation surface of the sample S with the ultrashort pulse light, the fluorescence detection unit 111 detects observation light over the observation surface of the sample S.

It is to be noted that the dichroic mirror 105 may be deviated from the optical path such that the observation light emitted from the sample S in the direction toward the objective lens 106 is all detected by the fluorescence detection unit 111.

In addition, the observation light emitted from the sample S in the direction opposite to the objective lens 106 is reflected by the dichroic mirror 112 to enter the fluorescence detection unit 113. The fluorescence detection unit 113 composed of, for example, a barrier filter, a PMT, and the like, receives the observation light reflected by the dichroic mirror 112, and outputs an electric signal corresponding to the amount of light. In addition, in accordance with scanning the observation surface of the sample S with the ultrashort pulse light, the fluorescence detection unit 113 detects observation light over the observation surface of the sample S.

The electric signals respectively output from the fluorescence detection units 107, 111, 113 are input to, for example, a computer (not shown), and the computer can generate an observation image based on the input electric signals, and display the generated observation image and store the data of the observation image.

Imaging Device

Figure 2:
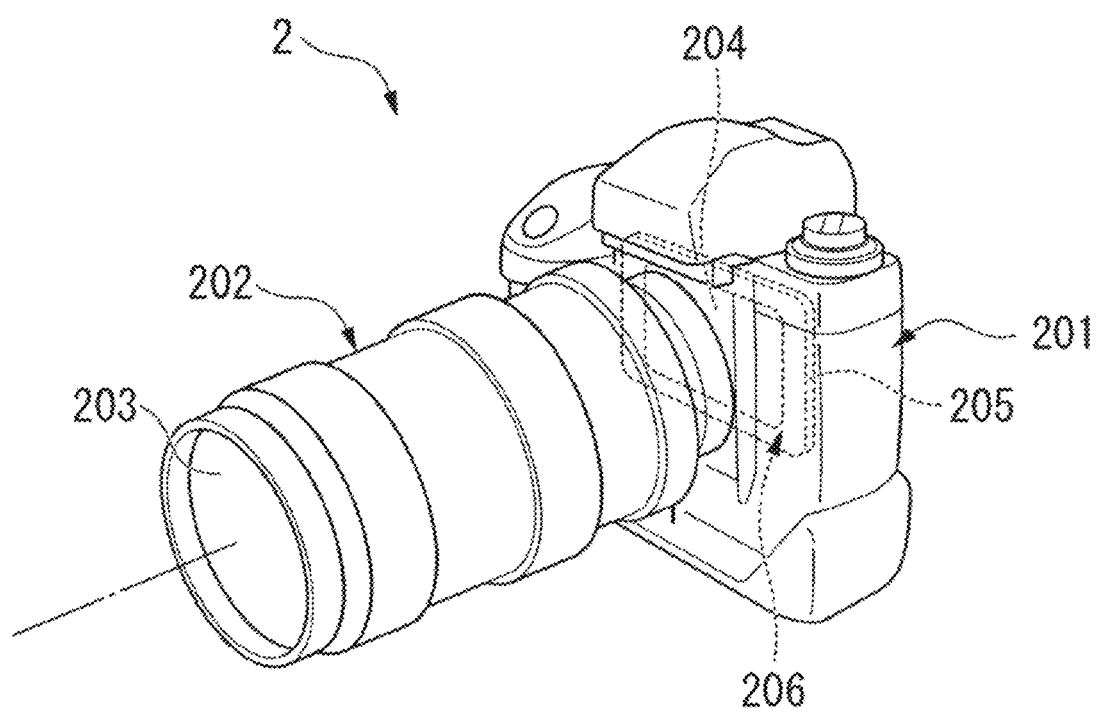
FIG. 2 is a perspective view of an imaging device including an optical element that uses an optical glass according to an embodiment of the present invention.

The optical element using the optical glass according to the present embodiment can also be used for an imaging device. FIG. 2 shows a perspective view of an imaging device including an optical element that uses an optical glass according to an embodiment of the present invention. The imaging device 2 (optical device) includes a lens 203 (optical element) with the optical glass according to the present embodiment as a base material.

The imaging device 2 is a so-called digital single-lens reflex camera, and a lens barrel 202 is detachably attached to a lens mount (not shown) of a camera body 201. Further, light passed through the lens 203 of the lens barrel 202 is imaged on a sensor chip (solid-state imaging element) 204 of a multichip module 206 disposed on the rear side of the camera body 201. This sensor chip 204 is a bare chip such as a so-called CMOS image sensor. The multichip module 206 is, for example, a COG (Chip On Glass) type module with the sensor chip 204 bare chip-mounted on a glass substrate 205.

It is to be noted that the optical device is not limited to such an imaging device, but intended to encompass a wide range of devices such as a projector. The optical element is also not limited to any lens but intended to encompass a wide range of elements such as a prism.

EXAMPLES

Next, the following examples and comparative examples will be described, but the present invention is not to be considered limited by the following examples in any way. Tables 2 to 8 show the composition, refractive index ($n_d$), Abbe number ($\nu_d$), partial dispersion ratios ($P_{g,F}$ and $P_{c,t}$), values ($\Delta P_{g,F}$, $\Delta P_{c,t}$) indicating anomalous dispersibility, and value of $\Delta P_{c,t}+5\cdot(\Delta P_{g,F}+0.0075)$, for optical glass according to each example and each comparative example.

<Preparation of Optical Glass>

The optical glass according to each example and each comparative example was prepared by the following procedure. First, glass raw materials such as oxides, hydroxides, carbonates, sulfates, and nitrates were weighed so as to provide the chemical compositions (% by mass) listed in each table. Next, the weighed raw materials were mixed and put into a platinum crucible, and melted at a temperature of 1200 to 1400° C. for about 1 hour, for stirring and homogenization. Thereafter, after bubbles were removed, each sample was obtained by lowering the temperature, casting into a mold, slow cooling, and molding.

Physical Property Measurement of Optical Glass

The refractive indices of the respective samples for d-line (587.562 nm), g-line (435.835 nm), F-line (486.133 nm), C-line (656.273 nm) and t-line (1013.98 nm) were measured with the use of an accurate refractive index measurement instrument ("Spectro Master HR" from TRIOPTICS). The Abbe number ($\nu_d$), partial dispersion ratios ($P_{g,F}$, $P_{c,t}$), $\Delta P_{g,F}$, $\Delta P_{c,t}$, and $\Delta P_{c,t}+5\times(\Delta P_{g,F}+0.0075)$ for the optical glass were calculated from the obtained actual measurement values. It is to be noted that the value of the refractive index used for the calculation was obtained down to seven places of decimals after the decimal point. It is to be noted that the term "denitrification" in Table 8 indicates a sample with glass partially or entirely devitrified in the manufacture of the glass. The samples were not subjected to the refractive-index measurement, because it is not possible to use the samples as optical glass.

The value ($\Delta P_{g,F}$) indicating anomalous dispersibility in the visible range and the value ($\Delta P_{c,t}$) indicating anomalous dispersibility in the near-infrared range were calculated by the following calculation method for the value ($\Delta P_{x,y}$) indicating anomalous dispersibility.

(1) Creation of Reference Line

First, as normal partial dispersion glass, two vitreous types of glass "NSL7" and "PBM2" (the names of vitreous types both manufactured by OHARA Co., Ltd., both) with the Abbe numbers ($\nu_d$) and partial dispersion ratios shown in Table 1 were selected as reference materials. Then, for each glass, the Abbe number ($\nu_d$) was indicated on the horizontal axis, the partial dispersion ratio ($P_{x,y}$) was indicated on the vertical axis, and a straight line connecting two points corresponding to the two reference materials was regarded as a reference line (Creation of Reference Line). It is to be noted that the partial dispersion ratio ($P_{x,y}$) refers to the ratio of (nx-ny) to the principal dispersion (nF-nC). The types of emission lines are put in x and y.

TABLE 1

|  | NSL7 | PBM2 |
| --- | --- | --- |
| $\nu_d$ | 60.49 | 36.26 |
| $P_{g,F}$ | 0.5436 | 0.5828 |
| $P_{c,t}$ | 0.8305 | 0.7168 |

(2) Calculation of Value Indicating Anomalous Dispersibility

Next, values corresponding to the optical glass according to each example and each comparative example were plotted on the graph with the Abbe number ($\nu_d$) on the horizontal axis and the partial dispersion ratio ($P_{x,y}$) on the vertical axis, and the difference between the point on the reference line, corresponding to the Abbe number ($\nu_d$) for the vitreous type mentioned above, and the value ($P_{x,y}$) on the vertical axis thereof was calculated as a value ($\Delta P_{x,y}$) indicating anomalous dispersibility. It is to be noted that the partial dispersion ratio above the reference line is referred to as a value indicating positive anomalous dispersibility, and the ratio below the straight line is referred to as a value indicating a negative anomalous dispersibility.

(3) Calculation of Value Indicating Anomalous Dispersibility in Visible Range and Value Indicating Anomalous Dispersibility in Near-Infrared Range Through the use of the above approach, $\Delta P_{g,F}$ was calculated as an index of anomalous dispersibility in the visible range, and $\Delta P_{c,t}$ was calculated as an index of anomalous dispersibility in the near-infrared range. The reference line equation in the visible range and the reference line equation in the near-infrared range are as follows. This anomalous dispersibility is expressed as a degree of deviation from the normal partial dispersion glass.

$$P_{g,F} = 0.641462 + (-0.0016178) \times v_d \quad \text{(i)}$$

$$P_{c,t} = 0.546649 + 0.00469253 \times v_d \quad \text{(ii)}$$

More specifically, the value ($\Delta P_{g,F}$) indicating anomalous dispersibility in the visible region refers to the difference between the point on the reference line, corresponding to the Abbe number ($v_d$), and the partial dispersion ratio ($P_{g,F}$), with the above-mentioned formula (i) as a reference line equation. The value ($\Delta P_{c,t}$) indicating anomalous dispersibility in the near-infrared range refers to the difference between the point on the reference line, corresponding to the Abbe number ($v_d$), and the partial dispersion ratio ($P_{c,t}$), with the above-mentioned formula (ii) as a reference line equation.

It has been also determined whether the value ($\Delta P_{g,F}$) indicating anomalous dispersibility in the visible range and the value ($\Delta P_{c,t}$) indicating anomalous dispersibility in the near-infrared range satisfy the relationship represented by the inequality $\Delta P_{c,t} \leq -5 \cdot (\Delta P_{g,F} + 0.0075)$ or not. More specifically, if the value of $\Delta P_{c,t} + 5 \cdot (\Delta P_{g,F} + 0.0075)$ is zero or negative, the above-mentioned inequality is evaluated as being satisfied, and if the value is positive, the inequality is evaluated as being unsatisfied.

Figure 3:
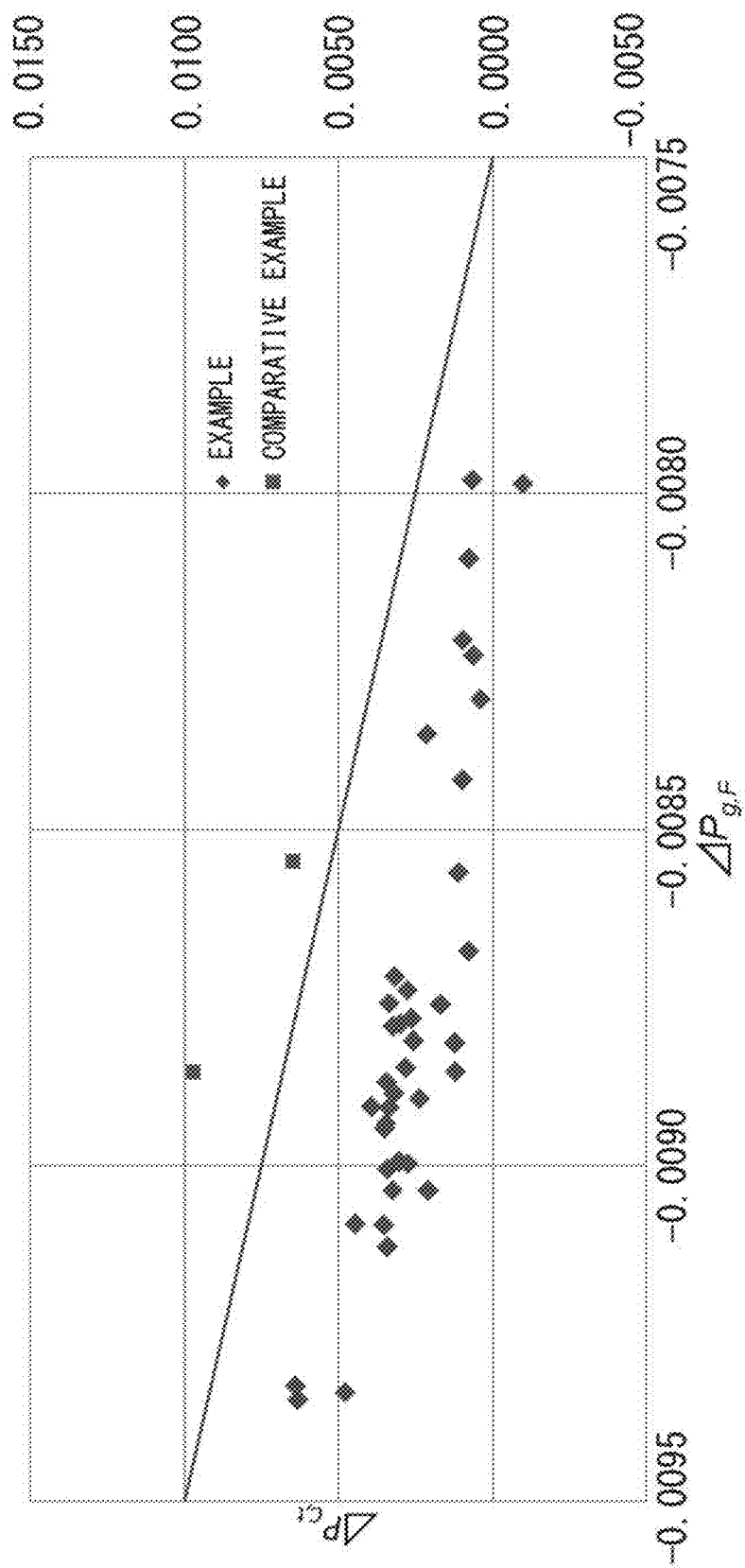
FIG. 3 is a graph obtained by plotting the values of $\Delta P_{g,F}$ and $\Delta P_{c,t}$ for examples.

Tables 2 to 8 show therein the compositions and evaluation results for each example and each comparative example. In addition, FIG. 3 shows therein a graph obtained by plotting the values of $\Delta P_{g,F}$ and $\Delta P_{c,t}$ for each example and each comparative example.

TABLE 2

|  | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| $SiO_2$ | 25.37 | 16.72 | 17.64 | 14.66 | 16.86 | 16.07 | 19.03 |
| $B_2O_3$ | 9.81 | 15.85 | 14.48 | 13.86 | 15.08 | 13.19 | 15.54 |
| $La_2O_3$ | 32.16 | 32.47 | 38.58 | 13.31 | 22.77 | 30.12 | 36.99 |
| $Y_2O_3$ | 4.28 | 4.33 | 7.57 | 0.00 | 19.37 | 4.02 | 4.93 |
| ZnO | 15.34 | 15.49 | 0.00 | 42.02 | 10.63 | 14.36 | 13.75 |
| $ZrO_2$ | 4.04 | 6.06 | 6.16 | 5.14 | 6.12 | 0.00 | 6.89 |
| $Ta_2O_5$ | 4.21 | 4.25 | 8.77 | 5.34 | 4.29 | 14.27 | 0.00 |
| $Li_2O$ | 2.87 | 2.90 | 2.95 | 2.45 | 2.93 | 2.69 | 2.67 |
| $Na_2O$ | 1.77 | 1.78 | 3.69 | 3.07 | 1.80 | 5.13 | 0.00 |
| $Sb_2O_3$ | 0.15 | 0.15 | 0.16 | 0.15 | 0.15 | 0.15 | 0.20 |
| Total | 100.00 | 100.00 | 100.00 | 100.00 | 100.00 | 100.00 | 100.00 |
| $SiO_2 + B_2O_3$ | 35.19 | 32.56 | 32.11 | 28.53 | 31.94 | 29.26 | 34.57 |
| $ZrO_2 + Ta_2O_5$ | 8.25 | 10.32 | 14.94 | 10.48 | 10.41 | 14.27 | 6.89 |
| $La_2O_3 + Y_2O_3 + ZnO$ | 51.78 | 52.29 | 46.15 | 55.33 | 52.77 | 48.51 | 55.67 |
| $Li_2O + Na_2O$ | 4.64 | 4.68 | 6.64 | 5.52 | 4.73 | 7.81 | 2.67 |
| $n_d$ | 1.71433 | 1.73173 | 1.73528 | 1.71392 | 1.73673 | 1.72241 | 1.73634 |
| $v_d$ | 48.53 | 47.78 | 47.45 | 44.20 | 48.13 | 45.82 | 49.23 |
| $P_{g,F}$ | 0.5550 | 0.5551 | 0.5554 | 0.5619 | 0.5547 | 0.5590 | 0.5530 |
| $\Delta P_{g,F}$ | −0.0080 | −0.0091 | −0.0093 | −0.0081 | −0.0089 | −0.0084 | −0.0088 |
| $P_{C,t}$ | 0.7734 | 0.7753 | 0.7757 | 0.7548 | 0.7759 | 0.7638 | 0.7809 |
| $\Delta P_{C,t}$ | −0.0010 | 0.0044 | 0.0064 | 0.0008 | 0.0034 | 0.0021 | 0.0032 |
| $\Delta P_{C,t} + 5 \times (\Delta P_{g,F} + 0.0075)$ | −0.0034 | −0.0035 | −0.0027 | −0.0022 | −0.0037 | −0.0022 | −0.0033 |

TABLE 3

|  | EXAMPLE 8 | EXAMPLE 9 | EXAMPLE 10 | EXAMPLE 11 | EXAMPLE 12 | EXAMPLE 13 | EXAMPLE 14 |
|---|---|---|---|---|---|---|---|
| $SiO_2$ | 17.34 | 16.35 | 16.76 | 16.07 | 22.22 | 19.48 | 16.60 |
| $B_2O_3$ | 15.50 | 14.61 | 15.00 | 13.80 | 11.66 | 13.74 | 13.63 |
| $La_2O_3$ | 33.69 | 31.76 | 32.60 | 25.36 | 31.84 | 32.16 | 34.32 |
| $Y_2O_3$ | 4.49 | 4.23 | 4.34 | 4.90 | 4.24 | 4.28 | 4.15 |
| ZnO | 16.07 | 15.15 | 15.55 | 13.38 | 15.19 | 15.34 | 10.84 |
| $ZrO_2$ | 2.18 | 3.99 | 4.10 | 4.97 | 5.95 | 6.00 | 5.80 |
| $Ta_2O_5$ | 4.41 | 6.07 | 5.25 | 7.51 | 4.17 | 4.21 | 8.26 |
| $Li_2O$ | 0.00 | 7.70 | 6.25 | 1.25 | 2.84 | 2.87 | 2.78 |
| $Na_2O$ | 6.17 | 0.00 | 0.00 | 12.58 | 1.75 | 1.77 | 3.47 |
| $Sb_2O_3$ | 0.15 | 0.14 | 0.15 | 0.18 | 0.14 | 0.15 | 0.15 |
| Total | 100.00 | 100.00 | 100.00 | 100.00 | 100.00 | 100.00 | 100.00 |
| $SiO_2 + B_2O_3$ | 32.84 | 30.95 | 31.77 | 29.88 | 33.87 | 33.22 | 30.22 |
| $ZrO_2 + Ta_2O_5$ | 6.59 | 10.06 | 9.35 | 12.49 | 10.12 | 10.22 | 14.06 |
| $La_2O_3 + Y_2O_3 + ZnO$ | 54.25 | 51.14 | 52.49 | 43.63 | 51.27 | 51.78 | 49.31 |
| $Li_2O + Na_2O$ | 6.17 | 7.70 | 6.25 | 13.82 | 4.59 | 4.64 | 6.25 |
| $n_d$ | 1.70695 | 1.72522 | 1.72912 | 1.68278 | 1.72446 | 1.72806 | 1.72132 |
| $v_d$ | 48.17 | 47.47 | 47.85 | 45.59 | 47.88 | 47.84 | 45.00 |
| $P_{g,F}$ | 0.5553 | 0.5556 | 0.5551 | 0.5587 | 0.5551 | 0.5552 | 0.5597 |
| $\Delta P_{g,F}$ | −0.0082 | −0.0090 | −0.0090 | −0.0090 | −0.0089 | −0.0089 | −0.0090 |
| $P_{C,t}$ | 0.7737 | 0.7726 | 0.7746 | 0.7627 | 0.7725 | 0.7740 | 0.7608 |
| $\Delta P_{C,t}$ | 0.0010 | 0.0032 | 0.0034 | 0.0021 | 0.0012 | 0.0028 | 0.0030 |
| $\Delta P_{C,t} + 5 \times (\Delta P_{g,F} + 0.0075)$ | −0.0026 | −0.0044 | −0.0041 | −0.0056 | −0.0056 | −0.0039 | −0.0045 |

TABLE 4

|  | EXAMPLE 15 | EXAMPLE 16 | EXAMPLE 17 | EXAMPLE 18 | EXAMPLE 19 | EXAMPLE 20 | EXAMPLE 21 |
| --- | --- | --- | --- | --- | --- | --- | --- |
| $SiO_2$ | 18.94 | 15.26 | 15.68 | 15.00 | 16.83 | 16.40 | 17.01 |
| $B_2O_3$ | 15.48 | 14.43 | 14.79 | 14.18 | 15.06 | 13.47 | 15.22 |
| $La_2O_3$ | 33.40 | 28.62 | 22.56 | 21.62 | 32.24 | 30.76 | 33.08 |
| $Y_2O_3$ | 4.91 | 3.82 | 3.91 | 3.75 | 4.99 | 4.11 | 4.41 |
| ZnO | 17.55 | 21.02 | 25.81 | 28.93 | 15.61 | 14.67 | 15.78 |
| $ZrO_2$ | 6.86 | 5.34 | 5.48 | 5.26 | 6.11 | 3.34 | 6.18 |
| $Ta_2O_5$ | 0.00 | 5.60 | 5.72 | 5.46 | 4.29 | 10.31 | 4.33 |
| $Li_2O$ | 2.66 | 2.56 | 2.62 | 2.51 | 2.92 | 2.75 | 2.02 |
| $Na_2O$ | 0.00 | 3.20 | 3.28 | 3.14 | 1.80 | 4.04 | 1.82 |
| $Sb_2O_3$ | 0.20 | 0.15 | 0.15 | 0.15 | 0.15 | 0.15 | 0.15 |
| Total | 100.00 | 100.00 | 100.00 | 100.00 | 100.00 | 100.00 | 100.00 |
| $SiO_2 + B_2O_3$ | 34.42 | 29.70 | 30.46 | 29.18 | 31.89 | 29.88 | 32.24 |
| $ZrO_2 + Ta_2O_5$ | 6.86 | 10.94 | 11.20 | 10.72 | 10.40 | 13.65 | 10.51 |
| $La_2O_3 + Y_2O_3 + ZnO$ | 55.86 | 53.46 | 52.28 | 54.29 | 52.85 | 49.53 | 53.26 |
| $Li_2O + Na_2O$ | 2.66 | 5.75 | 5.90 | 5.65 | 4.72 | 6.78 | 3.84 |
| $n_d$ | 1.73294 | 1.73048 | 1.72058 | 1.72439 | 1.72431 | 1.72828 | 1.73681 |
| $v_d$ | 48.91 | 46.25 | 46.06 | 45.52 | 47.73 | 46.12 | 47.54 |
| $P_{g,F}$ | 0.5536 | 0.5579 | 0.5582 | 0.5593 | 0.5554 | 0.5581 | 0.5558 |
| $\Delta P_{g,F}$ | −0.0087 | −0.0088 | −0.0087 | −0.0086 | −0.0088 | −0.0088 | −0.0088 |
| $P_{C,t}$ | 0.7791 | 0.7653 | 0.7655 | 0.7614 | 0.7732 | 0.7657 | 0.7731 |
| $\Delta P_{C,t}$ | 0.0030 | 0.0017 | 0.0027 | 0.0011 | 0.0026 | 0.0026 | 0.0033 |
| $\Delta P_{C,t} + 5 \times (\Delta P_{g,F} + 0.0075)$ | −0.0033 | −0.0046 | −0.0034 | −0.0042 | −0.0040 | −0.0038 | −0.0029 |

TABLE 5

|  | EXAMPLE 22 | EXAMPLE 23 | EXAMPLE 24 | EXAMPLE 25 | EXAMPLE 26 | EXAMPLE 27 | EXAMPLE 28 |
| --- | --- | --- | --- | --- | --- | --- | --- |
| $SiO_2$ | 17.16 | 17.66 | 17.40 | 14.84 | 16.86 | 16.86 | 17.10 |
| $B_2O_3$ | 15.34 | 15.80 | 15.56 | 13.29 | 15.08 | 15.08 | 14.03 |
| $La_2O_3$ | 33.35 | 34.34 | 33.81 | 28.87 | 27.77 | 22.77 | 35.33 |
| $Y_2O_3$ | 4.44 | 4.58 | 4.50 | 3.86 | 9.37 | 14.37 | 4.25 |
| ZnO | 15.91 | 16.37 | 16.11 | 13.77 | 15.63 | 15.63 | 8.24 |
| $ZrO_2$ | 4.19 | 6.40 | 6.30 | 4.22 | 6.12 | 6.12 | 5.97 |
| $Ta_2O_5$ | 4.37 | 1.11 | 2.18 | 11.72 | 4.29 | 4.29 | 8.50 |
| $Li_2O$ | 5.09 | 3.07 | 3.02 | 2.58 | 2.93 | 2.93 | 2.86 |
| $Na_2O$ | 0.00 | 0.47 | 0.92 | 6.70 | 1.80 | 1.80 | 3.57 |
| $Sb_2O_3$ | 0.15 | 0.20 | 0.20 | 0.15 | 0.15 | 0.15 | 0.15 |
| Total | 100.00 | 100.00 | 100.00 | 100.00 | 100.00 | 100.00 | 100.00 |
| $SiO_2 + B_2O_3$ | 32.50 | 33.47 | 32.95 | 28.14 | 31.94 | 31.94 | 31.12 |
| $ZrO_2 + Ta_2O_5$ | 8.56 | 7.51 | 8.48 | 15.94 | 10.41 | 10.41 | 14.47 |
| $La_2O_3 + Y_2O_3 + ZnO$ | 53.70 | 55.29 | 54.43 | 46.50 | 52.77 | 52.77 | 47.82 |
| $Li_2O + Na_2O$ | 5.09 | 3.53 | 3.94 | 9.28 | 4.73 | 4.73 | 6.43 |
| $n_d$ | 1.73165 | 1.73448 | 1.73428 | 1.73710 | 1.73332 | 1.73268 | 1.73438 |
| $v_d$ | 48.17 | 48.64 | 48.27 | 46.40 | 47.62 | 47.68 | 46.76 |
| $P_{g,F}$ | 0.5548 | 0.5539 | 0.5545 | 0.5573 | 0.5552 | 0.5552 | 0.5565 |
| $\Delta P_{g,F}$ | −0.0087 | −0.0089 | −0.0089 | −0.0091 | −0.0089 | −0.0091 | −0.0093 |
| $P_{C,t}$ | 0.7759 | 0.7781 | 0.7765 | 0.7678 | 0.7736 | 0.7739 | 0.7708 |
| $\Delta P_{C,t}$ | 0.0032 | 0.0033 | 0.0033 | 0.0034 | 0.0035 | 0.0035 | 0.0048 |
| $\Delta P_{C,t} + 5 \times (\Delta P_{g,F} + 0.0075)$ | −0.0029 | −0.0036 | −0.0038 | −0.0047 | −0.0037 | −0.0044 | −0.0044 |

TABLE 6

|  | EXAMPLE 29 | EXAMPLE 30 | EXAMPLE 31 | EXAMPLE 32 | EXAMPLE 33 | EXAMPLE 34 | EXAMPLE 35 |
| --- | --- | --- | --- | --- | --- | --- | --- |
| $SiO_2$ | 17.64 | 14.89 | 14.66 | 14.66 | 16.63 | 17.14 | 16.39 |
| $B_2O_3$ | 14.48 | 14.06 | 13.86 | 13.86 | 14.26 | 14.72 | 14.07 |
| $La_2O_3$ | 36.46 | 21.44 | 21.13 | 16.24 | 26.20 | 27.04 | 25.84 |
| $Y_2O_3$ | 4.38 | 0.99 | 0.00 | 0.00 | 5.06 | 5.22 | 4.99 |
| ZnO | 5.31 | 32.23 | 34.20 | 39.09 | 13.82 | 14.27 | 13.63 |
| $ZrO_2$ | 6.16 | 5.22 | 5.14 | 5.14 | 5.14 | 5.87 | 5.07 |
| $Ta_2O_5$ | 8.77 | 5.42 | 5.34 | 5.34 | 7.76 | 5.97 | 7.66 |
| $Li_2O$ | 2.95 | 2.49 | 2.45 | 2.45 | 1.29 | 1.33 | 1.27 |

TABLE 6-continued

|  | EXAMPLE 29 | EXAMPLE 30 | EXAMPLE 31 | EXAMPLE 32 | EXAMPLE 33 | EXAMPLE 34 | EXAMPLE 35 |
|---|---|---|---|---|---|---|---|
| $Na_2O$ | 3.69 | 3.11 | 3.07 | 3.07 | 9.66 | 8.25 | 10.90 |
| $Sb_2O_3$ | 0.16 | 0.15 | 0.15 | 0.15 | 0.18 | 0.19 | 0.18 |
| Total | 100.00 | 100.00 | 100.00 | 100.00 | 100.00 | 100.00 | 100.00 |
| $SiO_2 + B_2O_3$ | 32.11 | 28.95 | 28.53 | 28.53 | 30.88 | 31.87 | 30.46 |
| $ZrO_2 + Ta_2O_5$ | 14.94 | 10.63 | 10.48 | 10.48 | 12.90 | 11.84 | 12.72 |
| $La_2O_3 + Y_2O_3 + ZnO$ | 46.15 | 54.67 | 55.33 | 55.33 | 45.09 | 46.53 | 44.47 |
| $Li_2O + Na_2O$ | 6.64 | 5.60 | 5.52 | 5.52 | 10.95 | 9.58 | 12.17 |
| $n_d$ | 1.73110 | 1.72270 | 1.72312 | 1.71731 | 1.69522 | 1.69921 | 1.68983 |
| $v_d$ | 47.14 | 45.16 | 44.85 | 44.45 | 46.07 | 46.68 | 45.87 |
| $P_{g,F}$ | 0.5559 | 0.5600 | 0.5606 | 0.5613 | 0.5581 | 0.5570 | 0.5583 |
| $\Delta P_{g,F}$ | −0.0093 | −0.0084 | −0.0083 | −0.0082 | −0.0089 | −0.0089 | −0.0090 |
| $P_{C,t}$ | 0.7741 | 0.7596 | 0.7575 | 0.7559 | 0.7663 | 0.7696 | 0.7646 |
| $\Delta P_{C,t}$ | 0.0063 | 0.0010 | 0.0004 | 0.0006 | 0.0034 | 0.0039 | 0.0027 |
| $\Delta P_{C,t} + 5 \times (\Delta P_{g,F} + 0.0075)$ | −0.0029 | −0.0036 | −0.0036 | −0.0031 | −0.0034 | −0.0031 | −0.0048 |

TABLE 7

|  | EXAMPLE 36 | EXAMPLE 37 | EXAMPLE 38 | EXAMPLE 39 |
|---|---|---|---|---|
| $SiO_2$ | 16.26 | 15.91 | 14.66 | 16.79 |
| $B_2O_3$ | 13.95 | 13.65 | 13.86 | 15.67 |
| $La_2O_3$ | 25.63 | 32.07 | 10.38 | 41.78 |
| $Y_2O_3$ | 4.95 | 0.00 | 0.00 | 0.00 |
| ZnO | 13.52 | 13.23 | 44.95 | 17.12 |
| $ZrO_2$ | 5.02 | 4.92 | 5.14 | 6.09 |
| $Ta_2O_5$ | 7.60 | 7.43 | 5.34 | 0.00 |
| $Li_2O$ | 1.26 | 1.23 | 2.45 | 2.36 |
| $Na_2O$ | 11.63 | 11.38 | 3.07 | 0.00 |
| $Sb_2O_3$ | 0.18 | 0.18 | 0.15 | 0.19 |
| Total | 100.00 | 100.00 | 100.00 | 100.00 |
| $SiO_2 + B_2O_3$ | 30.21 | 29.56 | 28.53 | 32.47 |
| $ZrO_2 + Ta_2O_5$ | 12.62 | 12.35 | 10.48 | 6.09 |
| $La_2O_3 + Y_2O_3 + ZnO$ | 44.11 | 45.30 | 55.33 | 58.90 |
| $Li_2O + Na_2O$ | 12.89 | 12.61 | 5.52 | 2.36 |
| $n_d$ | 1.68680 | 1.69227 | 1.7112 | 1.7465 |
| $v_d$ | 45.74 | 45.55 | 43.87 | 48.50 |
| $P_{g,F}$ | 0.5586 | 0.5589 | 0.5625 | 0.5543 |
| $\Delta P_{g,F}$ | −0.0089 | −0.0088 | −0.0080 | −0.0087 |
| $P_{c,t}$ | 0.7637 | 0.7616 | 0.7532 | 0.7750 |
| $\Delta P_{c,t}$ | 0.0023 | 0.0012 | 0.0007 | 0.0008 |
| $\Delta P_{c,t} + 5 \times (\Delta P_{g,F} + 0.0075)$ | −0.0046 | −0.0054 | −0.00173 | −0.00511 |

TABLE 8

|  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| $SiO_2$ | 18.35 | 13.48 | 27.16 | 15.90 | 15.74 |
| $B_2O_3$ | 7.62 | 15.74 | 11.79 | 15.01 | 13.51 |
| $La_2O_3$ | 35.65 | 43.79 | 26.92 | 30.91 | 24.82 |
| $Y_2O_3$ | 4.75 | 0.00 | 3.59 | 0.00 | 4.79 |
| ZnO | 17.00 | 17.94 | 12.84 | 16.21 | 13.10 |
| $ZrO_2$ | 6.66 | 6.38 | 5.02 | 0.00 | 4.87 |
| $Ta_2O_5$ | 4.67 | 0.00 | 7.14 | 19.56 | 7.36 |
| $Li_2O$ | 3.18 | 2.47 | 2.40 | 2.23 | 1.22 |
| $Na_2O$ | 1.96 | 0.00 | 3.01 | 0.00 | 14.42 |
| $Sb_2O_3$ | 0.16 | 0.20 | 0.13 | 0.18 | 0.17 |
| Total | 100.00 | 100.00 | 100.00 | 100.00 | 100.00 |
| $SiO_2 + B_2O_3$ | 25.97 | 29.23 | 38.94 | 30.92 | 29.25 |
| $ZrO_2 + Ta_2O_5$ | 11.33 | 6.38 | 12.17 | 19.56 | 12.22 |
| $La_2O_3 + Y_2O_3 + ZnO$ | 57.40 | 61.73 | 43.35 | 47.12 | 42.71 |

TABLE 8-continued

| | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| $Li_2O + Na_2O$ | 5.14 | 2.47 | 5.41 | 2.23 | 15.64 |
| $n_d$ | DEVITRIFICATION | DEVITRIFICATION | 1.6917 | 1.7513 | DEVITRIFICATION |
| $v_d$ | DEVITRIFICATION | DEVITRIFICATION | 48.72 | 44.90 | DEVITRIFICATION |
| $P_{g,F}$ | DEVITRIFICATION | DEVITRIFICATION | 0.5541 | 0.5600 | DEVITRIFICATION |
| $\Delta P_{g,F}$ | DEVITRIFICATION | DEVITRIFICATION | −0.0085 | −0.0089 | DEVITRIFICATION |
| $P_{c,t}$ | DEVITRIFICATION | DEVITRIFICATION | 0.7817 | 0.7671 | DEVITRIFICATION |
| $\Delta P_{c,t}$ | DEVITRIFICATION | DEVITRIFICATION | 0.0065 | 0.0097 | DEVITRIFICATION |
| $\Delta P_{c,t} + 5 \times (\Delta P_{g,F} + 0.0075)$ | DEVITRIFICATION | DEVITRIFICATION | 0.00124 | 0.00291 | DEVITRIFICATION |

It has been confirmed that the optical glass according to each example has small values indicating anomalous dispersibility in the visible range and the near-infrared range. On the other hand, it was not possible to use, as optical glass, Comparative Examples 1, 2 and 5, because the obtained glass was partially or entirely devitrified. Comparative Example 3, with the large $\Delta P_{c,t}$, failed to satisfy the relational expression of $\Delta P_{c,t} - 5 \cdot (\Delta P_{g,F} + 0.0075)$. Comparative Example 4, with the large $n_d$ and $\Delta P_{c,t}$, failed to satisfy the relational expression of $\Delta P_{c,t} - 5 \cdot (\Delta P_{g,F} + 0.0075)$. It is to be noted that, in FIG. 3, an auxiliary line indicating $\Delta P_{c,t} = -5 \cdot (\Delta P_{g,F} + 0.0075)$ is shown for reference.

REFERENCE SIGNS LIST

1 Multiphoton microscope
101 Pulsed laser device
102 Pulse splitting device
103 Beam adjusting unit
104, 105, 112 Dichroic mirror
106 Objective lens
107, 111, 113 Fluorescence detection unit
108 Condenser lens
109 Pinhole
110 Imaging lens
S Sample
2 Imaging device
201 Camera body
202 Lens barrel
203 Lens
204 Sensor chip
205 Glass substrate
206 Multichip module

The invention claimed is:

1. An optical glass containing respective components of
   $SiO_2$ from 14 to 26% by mass,
   $B_2O_3$ from 9 to 16% by mass, and
   $La_2O_3$ from 10 to 42% by mass
   as essential components, and
   containing respective components of ZnO, $Y_2O_3$, $ZrO_2$, $Ta_2O_5$, $Li_2O$, and $Na_2O$ as optional components, and satisfying respective relationships of
   $SiO_2 + B_2O_3$ from 28 to 36% by mass,
   $ZrO_2 + Ta_2O_5$ from 6 to 16% by mass,
   $La_2O_3 + Y_2O_3 + ZnO$ from 43 to 59% by mass, and
   $Li_2O + Na_2O$ from 2 to 14% by mass.

2. The optical glass according to claim 1, further containing respective components of
   ZnO from 0% by mass to 45% by mass,
   $Y_2O_3$ from 0% by mass to 20% by mass,
   $ZrO_2$ from 0% by mass to 7% by mass,
   $Ta_2O_5$ from 0% by mass to 15% by mass,
   $Li_2O$ from 0% by mass to 8% by mass,
   $Na_2O$ from 0% by mass to 13% by mass, and
   $Sb_2O_3$ from 0% by mass to 1% by mass.

3. The optical glass according to claim 2, containing a component of
   $Y_2O_3$ from 0% by mass to 5% by mass.

4. The optical glass according to claim 1, wherein the optical glass has a refractive index ($n_d$) from 1.68 to 1.75, and Abbe number ($v_d$) from 43 to 50.

5. The optical glass according to claim 1, wherein a value ($\Delta P_{c,t}$) indicating anomalous dispersibility in a near-infrared range is 0.0100 or less.

6. The optical glass according to claim 1, wherein a value ($\Delta P_{g,F}$) indicating anomalous dispersibility in a short wavelength visible range is −0.0075 or less.

7. The optical glass according to claim 1, wherein
   a value ($\Delta P_{c,t}$) indicating anomalous dispersibility in a near-infrared range and a value ($\Delta P_{g,F}$) indicating anomalous dispersibility in a visible range
   satisfy a relational expression represented by
   $\Delta P_{c,t} \leq -5 \cdot (\Delta P_{g,F} + 0.0075)$.

8. An optical element comprising the optical glass according to claim 1.

9. An optical device comprising the optical element according to claim 8.

* * * * *